(12) United States Patent
Morgan

(10) Patent No.: US 6,449,629 B1
(45) Date of Patent: Sep. 10, 2002

(54) THREE INPUT SPLIT-ADDER

(75) Inventor: Edward Clayton Morgan, Macungie, PA (US)

(73) Assignee: Agere Systems Guardian Corp., Orlando, FL (US)

(*) Notice: Subject to any disclaimer, the term of this patent is extended or adjusted under 35 U.S.C. 154(b) by 0 days.

(21) Appl. No.: 09/310,404

(22) Filed: May 12, 1999

(51) Int. Cl.[7] .............................. G06F 7/38; G06F 7/50
(52) U.S. Cl. ...................................... 708/518; 708/709
(58) Field of Search ................................ 708/518, 709, 708/670

(56) References Cited

U.S. PATENT DOCUMENTS

| | | | | |
|---|---|---|---|---|
| 4,707,800 A | * | 11/1987 | Montrone et al. | 708/518 |
| 4,768,160 A | * | 8/1988 | Yokoyama | 708/518 |
| 5,189,636 A | * | 2/1993 | Patti et al. | 708/518 |
| 5,327,369 A | * | 7/1994 | Ashkenazi | 708/518 |
| 5,390,135 A | * | 2/1995 | Lee et al. | 708/518 |
| 5,493,524 A | * | 2/1996 | Guttag et al. | 708/709 |
| 5,757,685 A | * | 5/1998 | Ohuchi | 708/518 |
| 5,883,824 A | * | 3/1999 | Lee et al. | 708/518 |
| 5,933,362 A | * | 8/1999 | Inoue | 708/518 |
| 6,003,125 A | * | 12/1999 | Shippy | 708/518 |

* cited by examiner

Primary Examiner—Tan V. Mai
(74) Attorney, Agent, or Firm—David L. Smith

(57) ABSTRACT

An integrated circuit includes an adder having a first adder circuit for receiving a portion of the operands to be summed, along with corresponding carry-in inputs. The first adder circuit provides a sum output and carry-out outputs. A second adder circuit receives another portion of the operands to be summed, along with corresponding carry-in inputs. Multiplexers between the first and second adder circuits determine whether the carry-in inputs to the second adder circuit are the same the carry-in inputs to the first adder circuit or whether the carry-in inputs to the second adder circuit are independent.

18 Claims, 3 Drawing Sheets

THREE INPUT SPLIT-ADDER

FIELD OF THE INVENTION

This invention relates to adders and more particularly to adders in which a split-add operation can be utilized to increase computational throughput.

BACKGROUND OF THE INVENTION

Addition forms the basis of many processing operations including counting, subtraction, multiplication and filtering. A wide variety of adder circuits that add binary numbers provide an implementation with a trade-off between the speed of completing the addition operation and the amount of hardware, as measured by area required on an integrated circuit, to complete an addition operation. While three binary number representations are available, sign-magnitude, one's complement, and two's complement, computations are more efficient using the two's complement number representation. Adders can be used to accomplish subtraction by generating the two's complement of the subtrahend and adding the minuend. The two's complement of the subtrahend can be generated internal to the adder by providing the subtrahend in one's complement representation and adding one using the carry-in input to the adder.

A split adder is an adder that is capable of operating in a non-split mode on operands having a relatively large number of bits, and in split mode is capable of operating as more than one adder on operands having relatively fewer bits. Split adders are employed to take advantage of existing hardware where a tradeoff between precision and the number of adders can be made, and to gain additional computational throughput without requiring additional hardware. Split-adders in which the most significant bit portion of two operands are added in a first portion of an adder, and the least significant bit portions of two operands are added in a second portion of an adder are known. Known split-adders, however, can not accommodate more than two operands as inputs.

SUMMARY OF THE INVENTION

In accordance with the invention, an integrated circuit includes an adder having a first adder circuit for receiving a portion of the operands to be summed, along with corresponding carry-in inputs. The first adder circuit provides a sum output and carry-out outputs. A second adder circuit receives another portion of the operands to be summed, along with the corresponding carry-in inputs. Multiplexers between the first and second adder circuits determine whether the carry-in inputs to the second adder circuit are the same as the carry-in inputs to the first adder circuit or whether the carry-in inputs to the second adder circuit are independent.

DETAILED DESCRIPTION

Figure 1:
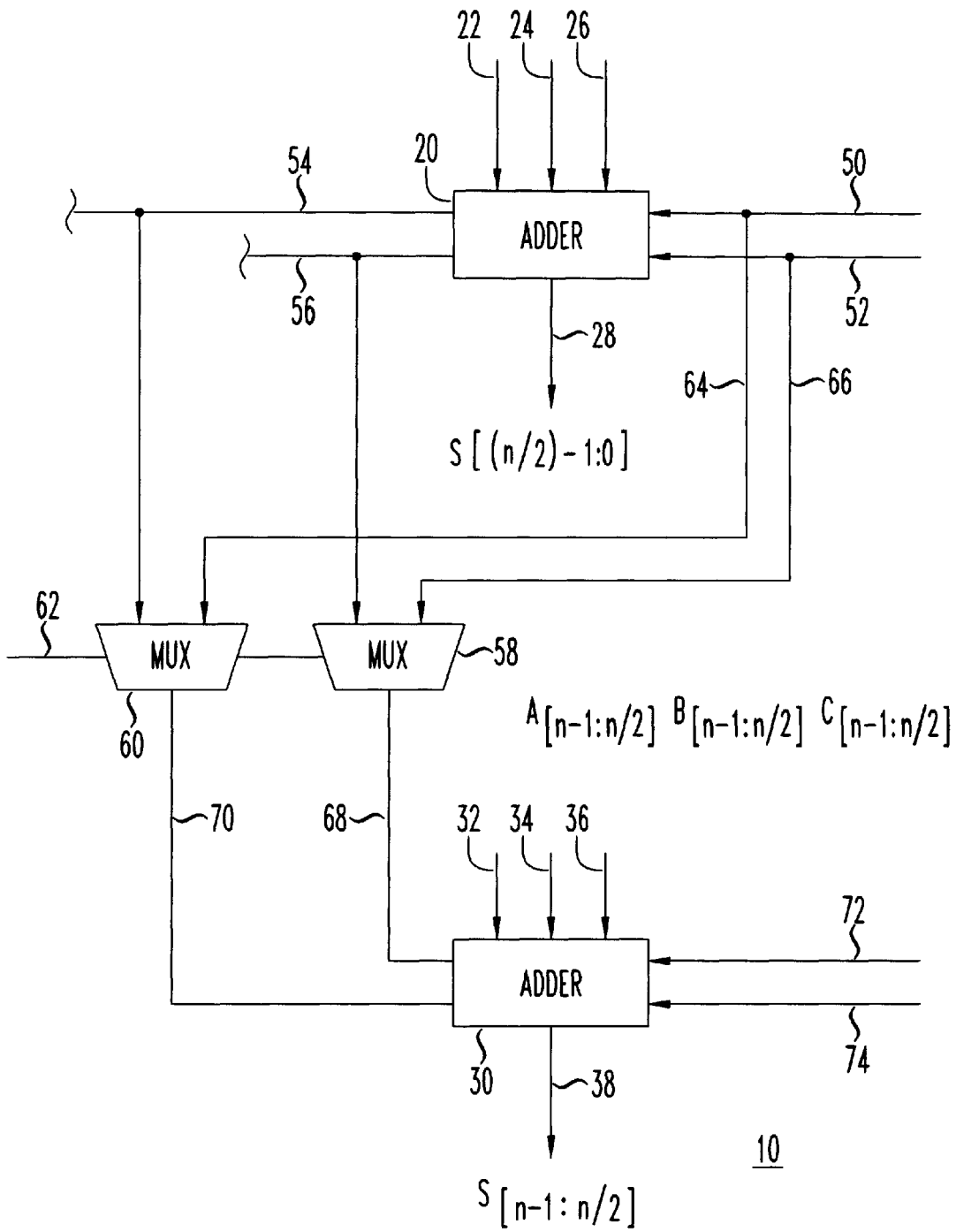
FIG 1 is a schematic diagram of an illustrative embodiment of an adder in accordance with the present invention.

A schematic diagram of an illustrative embodiment of a three-input adder 10 capable of being operated in split-mode operation as more than one adder with multiplexing between the adders, where each of the adders in split mode operation has more than two operand inputs, is shown in FIG. 1. Adder 10 may be fabricated as part of an integrated circuit, such as a microprocessor, microcontroller or digital signal processor. Adder 10 may be comprised of more than one multiple input adder, for example split adder 20 and split adder 30. The less significant bits of each of operands A, B and C are provided as inputs 22, 24 and 26 respectively to adder 20 operating as a three input adder. The more significant bits of each of operands A, B and C are provided as inputs 32, 34 and 36 respectively to adder 30 operating as a three-input adder.

Each adder 20 and 30 receives as many carry-in inputs as it provides carry-out outputs. Typically the number of carry-in inputs and carry-out outputs is one less than the number of operands. The operands may be compressed from I to two inputs by an I:2 compressor, not shown. See *Computer Arithmetic Algorithms* by I. Koren, the disclosure of which is hereby incorporated by reference. Carry-in inputs 50 and 52 are provided to adder 20 and also as first inputs to respective multiplexers 60 and 58. Adder 20 operating as a three-input adder produces carry-out outputs 54 and 56 which provide, respectively, second inputs to multiplexers 60 and 58. A mode select signal 62 provides the carry select input to multiplexers 60 and 58. The carry select input takes on one of two states and determines which of the inputs to multiplexers 60 and 58 are selected as their respective outputs 70 and 68. Outputs 70 and 68 provide the carry-in inputs to three-input adder 30.

Adder 20 operating as a three-input adder is a lower bit adder that receives inputs 22, 24 and 26 as well as carry-in inputs 50 and 52. Adder 20 provides a multiple bit sum 28 as an output that is the sum of the inputs. Adder 20 also provides carry-out outputs 54 and 56.

Adder 30 is a higher bit adder that receives inputs 32, 34 and 36 as well as carry-in inputs 70 and 68. Adder 30 operating as a three-input adder provides a multiple bit sum 38 as an output that is the sum of the inputs. Adder 30 also provides carry-out outputs 72 and 74.

Adders 20 and 30 may be any type of adder and may be operated as a single adder, or in a split-add mode as two independent adders, each with less precision than when operated as a single adder. In the single adder mode of operation, the lower order bits of each of the operands to be added are provided to adder 20 and the higher order bits of each of the operands to be added are provided to adder 30. In a preferred embodiment, each of adders 20 and 30 are capable of adding operands having the same number of bits, although the invention is not limited thereto. An example will be described in which three n-bit operands are added, with half of the bits (n/2 bits) of each operand provided to each adder, although the invention is not limited thereto.

For example, input 22 can represent the low order n/2 bits of input A, with input 32 representing the high order n/2 bits of input A. Input 24 can represent the low order n/2 bits of input B, with input 34 representing the high order n/2 bits of input B. Similarly, input 26 can represent the low order n/2 bits of input C, with input 36 representing the high order n/2 bits of input C.

In operation as a single adder, carry-in inputs 50 and 52 are provided to adder 20. For addition operations, carry-in inputs 50 and 52 are typically zero. Thus, the carry-out outputs 54 and 56 from adder 20 become the carry-in inputs 70 and 68 to adder 30. Adder 20 operating as a three input adder receives inputs 22, 24 and 26 as well as carry-in inputs 50 and 52. Adder 20 provides as outputs a multiple bit sum output 28 representing n/2 of the lower order bits in the sum and carry-out outputs 54 and 56. The carry-out outputs from adder 20 are provided, based on the state of mode select signal 62, through multiplexers 60 and 58 as outputs 70 and 68 which are carry-in inputs to adder 30. One skilled in the art would know how to generate a mode select signal having two states to accomplish the desired selection. Adder 30 provides a sum output representing n/2 high order bits in the sum and carry-out outputs 72 and 74. When m operands, each having n-bits, are added, the sum can have as many as [n+(m−1)] bits. Thus the sum of the operands provided to adders 20 and 30 is represented by the sum output 28 from adder 20, concatenated with the sum output 38 from adder 30. Carry-out outputs 72 and 74 are used to calculate the highest order bit of the summation.

Continuing the above example, with adder 10 operating in split-adder operation, adder 20 is capable of adding three operands, with adder 30 being capable of also adding three independent operands, albeit operands in the split-adder operation can have a total of as many bits as operands added by adder 10 operated as a single adder. For example, in split-adder mode, the number of additions can be doubled by adders 20 and 30 operating independently of each other, where half of the precision of operating adders 20 and 30 as a single adder is required.

In split adder operation, operand inputs 22, 24 and 26 as well as carry-in inputs 50 and 52 are provided to adder 20. Adder 20 provides a multiple bit sum 28 that is the sum of operands 22, 24 and 26, as well as carry-in inputs 50 and 52. Adder 20 also provides carry-out outputs 54 and 64 which may be used elsewhere in the system. Carry-out outputs 54 and 56 are used to determine whether an overflow has occurred and possibly determine the highest order bit of the summation. Mode select signal 62 is generated to have one of two states to select inputs 64 and 66 as outputs from multiplexers 60 and 58. One skilled in the art would know how to generate a mode select signal having two states to accomplish the desired selection. In this manner, inputs 64 and 66 provide the carry-in inputs 70 and 68 to adder 30. Operand inputs 32, 34 and 36 as well as carry-in inputs 70 and 68 are combined in adder 30 to provide multiple bit sum 38 that is the sum of the operand inputs and carry-in inputs. Adder 30 also provides carry-out outputs 72 and 74 which may be used elsewhere in the system. Carry-out outputs 72 and 74 are used to determine whether an overflow has occurred and possibly determine the highest order bit of the summation.

Figure 2:
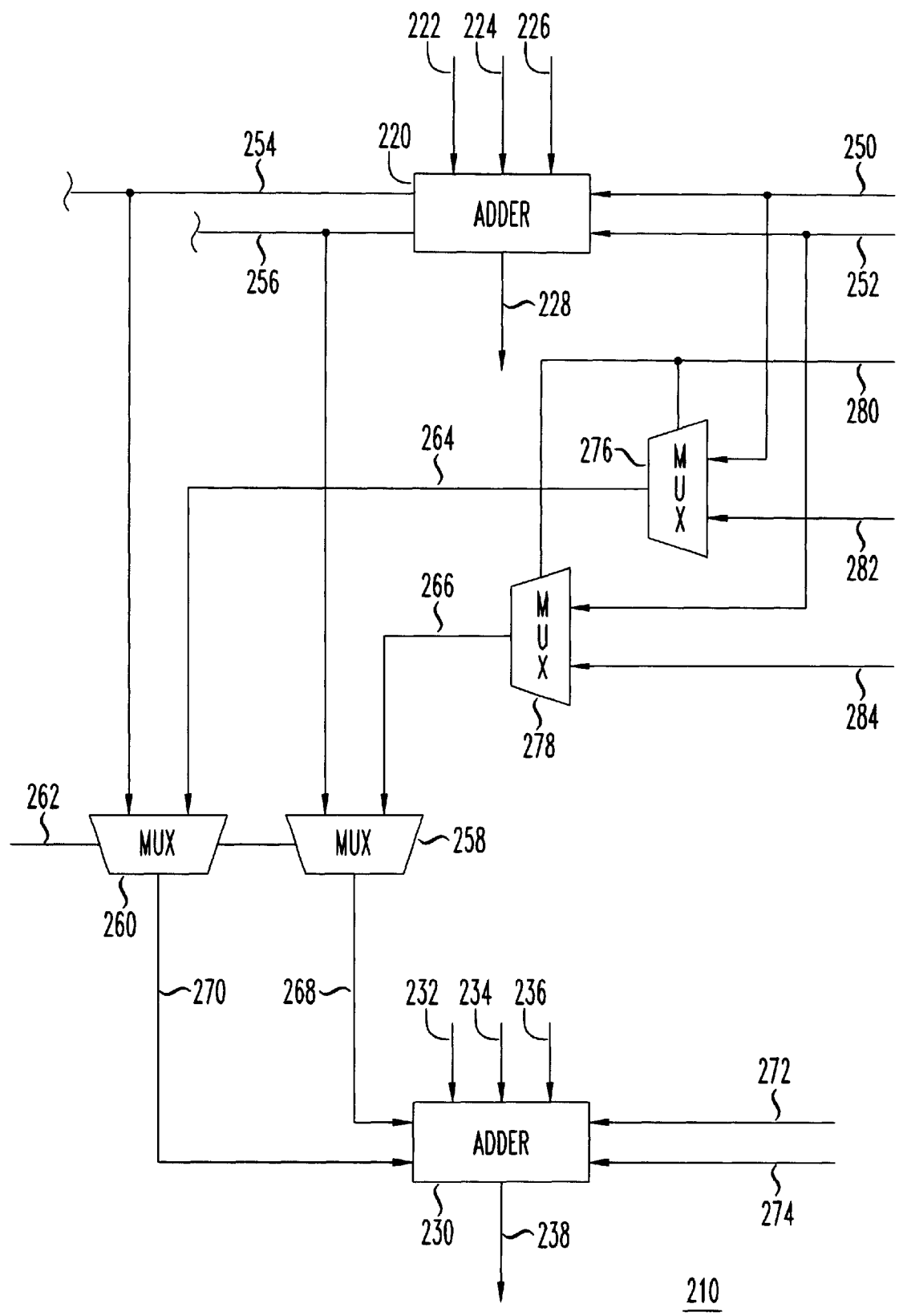
FIG. 2 is a schematic diagram of an alternate illustrative embodiment of an adder in accordance with the present invention, having separate carry-in inputs for each stage of split operation.

An alternative embodiment adder 210 is shown in the schematic diagram of FIG. 2. In adder 210, multiplexers 276 and 278 respectively are provided between carry-in input 250 and multiplexer 260 as well as between carry-input 252 and multiplexer 258. Multiplexers 276 and 278 permit carry-in inputs 282 and 284 to be provided to adder 230 operating as a three-input adder, independent of carry-in inputs 250 and 252, by select input 280 selecting as outputs from multiplexers 276 and 278 carry-in inputs 282 and 284. One skilled in the art would know how to generate a mode select signal having two states to accomplish the desired carry-in input selection. In addition, multiplexers 260 and 258 through carry-select input 262 select outputs 264 and 266 from multiplexers 276 and 278 as carry-in inputs 270 and 268 to adder 230 operating as a three-input adder.

Figure 3:
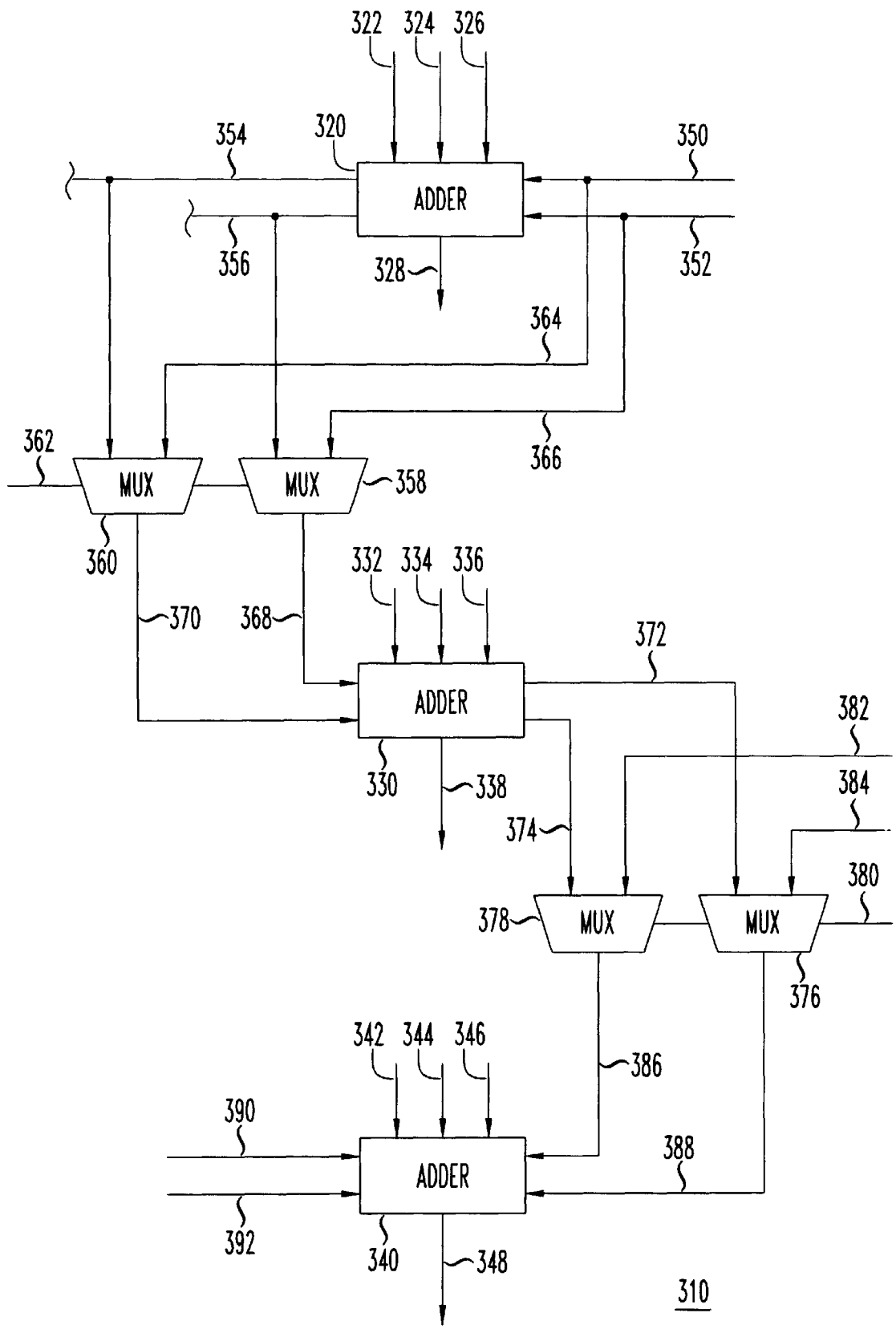
FIG. 3 is a schematic diagram of yet another alternative illustrative embodiment of an adder in accordance with the present invention, illustrating more than two adders in the split mode.

An alternative embodiment adder 310 is shown in the schematic diagram of FIG. 3 in which adder 310 can be split into three adders. The adders need not have the same number of bits in each operand. Adders 320, 330 and 340 are similar to adders 20 and 30 illustrated in FIG. 1 and described above. Adder 320 receives three multiple bit inputs 322, 324 and 326 as well as carry-in inputs 350 and 352. Adder 320 combines the inputs to produce a sum output 328 and carry-out outputs 354 and 356. Carry-out outputs 354 and 356 are passed by multiplexers 360 and 358 to be carry-in inputs 368 and 370 when select input 362 is in a first state corresponding to the single adder mode, and when select input 362 is in a second state corresponding to the split adder mode, carry-in inputs 350 and 352 are selected as the carry-inputs 368 and 370.

Adder 330 operating as a three-input adder receives three multiple bit inputs 332, 334 and 336 as well as carry-in inputs 368 and 370. Adder 330 combines the inputs to produce a sum output 338 and carry-out outputs 372 and 374. Carry-out outputs 372 and 374 from three-input adder 330 are passed by multiplexers 376 and 378 to be carry-in inputs 386 and 388 when select input 380 is in a first state corresponding to the single adder mode, and when select input 380 is in a second state corresponding to the split adder mode, carry-in inputs 382 and 384 are selected as the carry-in inputs 386 and 388, respectively.

Adder 340 operating as a three-input adder receives three multiple bit inputs 342, 344 and 346 as well as carry-in inputs 386 and 388. Adder 340 combines the inputs to produce a sum output 348 and carry-out outputs 390 and 392. Carry-out outputs 372 and 374 are passed by multiplexers 376 and 378 to be carry-in inputs 386 and 388 when select input 380 is in a first state corresponding to the single adder mode, and when select input 380 is in a second state, carry-in inputs 382 and 384 are selected as the carry-in inputs 386 and 388 to three input adder 340, independent of the carry-in inputs to adders 320 and 330. Select inputs 362 and 380 may operate as if the same signal were applied to each or different signals are applied to each. One skilled in the art would know how to generate one or more mode select signals having two states to accomplish the desired selection.

In this manner, in single mode operation adder 310 includes adders 320, 330 and 340 operating as a single adder with carry-out outputs from adder 320 provided to adder 330 as carry-in inputs, and carry-out outputs from adder 330 are provided to adder 340 as carry-in inputs. The sum of the operands and carry-in inputs provided to adders 320, 330 and 340 is represented by the sum output 328 from adder 320 concatenated with the sum output 338 from adder 330 concatenated with the sum output 348 from adder 340. Carry-out outputs 390 and 392 from adder 340 are used to calculate the highest order bit in the summation.

While the invention in various embodiments have been described as adding multiple inputs to form a sum output, the invention is not limited thereto. Based on the disclosure, one skilled in the art could subtract one or more operands from the operands or operand. This could be accomplished, for example, by presenting the operands to be subtracted to an adder in one's-complement form and setting a corresponding carry-in input to be a logic high. Various embodiments of the invention, in the single adder mode would have the carry-in input to the high order bit adder corresponding to the operand or operands to be subtracted set to a logic high. In the split adder mode of operation, through appropriate multiplexing, any of the operands could be subtracted from one or more of the other operands. The carry-in inputs to the high order bit adder need not be present when operands are to be added only.

What is claimed is:

1. An adder comprising:

a first adder circuit for receiving as inputs a plurality, k, of operands, k being an integer at least three, and k−1 carry-in inputs, the first adder circuit providing as outputs a sum that is a sum of the k inputs and the k−1 carry-in inputs, the first adder circuit providing k−1 carry-out outputs;

k−1 multiplexers, each of the k−1 multiplexers adapted to receive as inputs a respective one of the k−1 carry-in inputs to the first adder circuit as a first input and a respective one of the k−1 carry-out outputs from the first adder circuit as a second input, each of the k−1 multiplexers receiving a respective select input for selecting one of the inputs as a respective multiplexer output; and a second adder circuit for receiving as inputs a plurality, m, of operands, m being an integer at least three, and m−1 carry-inputs, the second adder circuit providing as outputs a sum that is a sum of the m inputs and the m−1 carry-in inputs, such that when the select input takes on a first state the carry-out outputs from the first adder circuit are provided as carry-in inputs to the second adder circuit and the first adder circuit and second adder circuit operate as a single adder, and when the select input takes on a second state, the first adder circuit and second adder circuits operate in split mode as independent adders.

2. An adder as recited in claim 1, wherein the number of inputs k to the first adder circuit is the same as the number of inputs m to the second adder circuit.

3. An adder as recited in claim 1, wherein the operands are multiple-bit operands, producing a sum that is a multiple-bit sum.

4. An adder as recited in claim 3, wherein the number of bits in the operands provided as inputs to the first adder circuit is the same as the number of bits in the operands provided as inputs to the second adder circuit.

5. An adder as recited in claim 1, further comprising:

k−1 additional multiplexers, each of the additional multiplexers adapted to receive as a first input one of the k−1 carry-in inputs and as a second input a further carry-in input, each additional multiplexer also adapted to receive a select input for selecting one of the additional multiplexer inputs as a respective additional multiplexer output, the k−1 additional multiplexers provided as the respective second inputs to the outputs of the k−1 multiplexers.

6. An adder as recited in claim 1, wherein the second adder circuit further provides m−1 carry-out outputs.

7. An adder, comprising:

a first adder circuit for receiving as inputs a plurality, k, of operands, k being an integer at least three, and k−1 carry-in inputs, the first adder circuit providing as outputs a sum that is a sum of the k inputs and the k−1 carry-in inputs, the first adder circuit providing k−1 carry-out outputs;

k−1 first multiplexers, each of the k−1 first multiplexers adapted to receive as inputs a respective one of the k−1 carry-in inputs to the first adder circuit as a first input and a respective one of the k−1 carry-out outputs from the first adder circuit as a second input, each of the k−1 first multiplexers receiving a respective first select input for selecting one of the first multiplexer inputs as a respective first multiplexer output;

a second adder circuit for receiving as inputs a plurality, m, of operands, m being an integer greater than two, and m−1 carry-in inputs, such that when the first select input takes on a first state at least some of the carry-out outputs from the first adder circuit are provided as carry-in inputs to the second adder circuit and the first adder circuit and second adder circuit operate as a single adder, and when the first select input takes on a second state, the first adder circuit and the second adder circuit operate in split mode as independent adders, the second adder circuit providing as an output a sum that is a sum of the m inputs and the m−1 carry-in inputs, the second adder circuit providing m−1 carry-out outputs;

m−1 second multiplexers, each of the m−1 second multiplexers adapted to receive as inputs a respective one of the m−1 carry-in inputs to the second adder circuit as a first input and a respective one of the m−1 carry-out outputs from the second adder circuit as a second input, each of the m−1 second multiplexers receiving a respective second select input for selecting one of the second multiplexer inputs as a respective second multiplexer output; and a third adder circuit for receiving as inputs a plurality, n, of operands, n being an integer greater than two, and n−1 carry-in inputs, such that when the second select input takes on a first state at least some of the carry-out outputs from the second adder circuit are provided as carry-in inputs to the third adder circuit and the second adder circuit and third adder circuit operate as a single adder, and when the second select input takes on a second state, the second adder circuit and the third adder circuit operate in split mode as independent adders, the third adder circuit providing as an output a sum that is a sum of the n inputs and the n−1 carry-in inputs.

8. An adder as recited in claim 7, wherein the state of the first select input is the same as the state of the second select input.

9. An adder as recited in claim 7, wherein the state of the first select input differs from the state of the second select input.

10. An adder as recited in claim 7, wherein the adder is fabricated in an integrated circuit.

11. An integrated circuit, including an adder, comprising:

a first adder circuit for receiving as inputs a plurality, k, of operands, k being an integer at least three, and k−1 carry-in inputs, the first added circuit providing as outputs a sum that is a sum of the k inputs and the k—1 carry-in inputs, the first adder circuit providing k−1 carry-out outputs;

k−1 multiplexers, each of the k−1 multiplexers adapted to receive as inputs a respective one of the k−1 carry-in inputs to the first adder circuit as a first input and a respective one of the k−1 carry-out from the first adder circuit as a second input, each of the k−1 multiplexers receiving a respective select input for selecting on of the inputs as a respective multiplexer output; and a second adder circuit for receiving as inputs a plurality, m, of operands, m being an integer at least three, and m−1 carry-in inputs, the second adder circuit providing as outputs a sum that is a sum of the m inputs and the m−1 carry-in inputs, such that when the select input takes on a first state the carry-out outputs from the first adder circuit are provided as carry-in inputs to the second adder circuit and the first adder circuit and second adder circuit operate as a single adder, and when the select input takes on second state, the first adder circuit and second adder circuits operate in split mode as independent adders.

12. An integrated circuit as recited in claim 11, wherein the number of inputs k to the first adder circuit is the same as the number of inputs m to the second adder circuit.

13. An integrated circuit as recited in claim 11, wherein the number of bits in the operands provided as inputs to the first adder circuit is the same as the number of bits in the operands provided as inputs to the second adder circuit.

14. An integrated circuit as recited in claim 11, further comprising:

k−1 additional multiplexers, each of the additional multiplexers adapted to receive as a first input one of the k−1 carry-in inputs and as a second input a further carry-in input, each additional multiplexer also adapted to receive a select input for selecting one of the additional multiplexer inputs as a respective additional multiplexer output, the k−1 additional multiplexers providing as outputs the respective second inputs to the k−1 multiplexers.

15. An integrated circuit as recited in claim 11, wherein the second adder circuit further provides m−1 carry-out outputs.

16. An integrated circuit as recited in claim 11, wherein the integrated circuit is a digital signal processor.

17. An integrated circuit as recited in claim 11, wherein the integrated circuit is a microcontroller.

18. An integrated circuit as recited in claim 11, wherein the integrated circuit is a microprocessor.

* * * * *